US005170627A

United States Patent [19]

Wallis

[11] Patent Number: 5,170,627
[45] Date of Patent: Dec. 15, 1992

[54] GAS CYLINDER CONTROL SYSTEM

[76] Inventor: Bernard J. Wallis, 2215 Dacosta, Dearborn, Mich. 48128

[21] Appl. No.: 762,423

[22] Filed: Sep. 19, 1991

[51] Int. Cl.[5] ........................ F15B 7/00; F16D 31/02; F01B 1/00

[52] U.S. Cl. ........................................ 60/545; 60/533; 60/591; 60/394; 91/165

[58] Field of Search ................. 60/325, 533, 545, 568, 60/569, 571, 583, 590, 591, 394; 91/165, 280; 251/251

[56] References Cited

U.S. PATENT DOCUMENTS

| | | | |
|---|---|---|---|
| 27,801 | 4/1860 | Higginbotham | 251/251 |
| 996,692 | 7/1911 | Webb | 60/387 X |
| 1,763,474 | 6/1930 | Mattern, Jr. | 91/280 |
| 1,988,066 | 1/1935 | Zavarella | 60/583 |
| 2,089,279 | 8/1937 | Loeffler | 251/251 X |
| 3,229,957 | 1/1966 | Jehn | 251/251 |
| 3,347,461 | 10/1967 | Thorburn | 91/280 X |
| 3,759,483 | 9/1973 | Baxter | 251/251 X |
| 3,906,726 | 9/1975 | Jameson | 60/387 X |
| 3,990,240 | 11/1976 | Harcuba | 60/533 |
| 5,058,385 | 10/1991 | Everett, Jr. | 60/571 |

*Primary Examiner*—Edward K. Look
*Assistant Examiner*—John Ryznic
*Attorney, Agent, or Firm*—Barnes, Kisselle, Raisch, Choate, Whittemore & Hulbert

[57] ABSTRACT

A gas cylinder control system for use with machine systems such as die stamping systems that includes at least one gaseous fluid cylinder associated with the machine system, gaseous intensifier control cylinder normally operated in timed relation to the gaseous cylinder and a passage providing communication between the gaseous cylinder and the gaseous intensifier control cylinder. The gaseous intensifier cylinder operates at substantially higher pressure than the die cylinder. A normally closed control valve is provided in the passage and is operable to open the passage in time relation to the operation of the machine system in order to apply the higher gaseous pressure of the gaseous intensifier cylinder to the gaseous cylinder and lock the gaseous cylinder and prevent it from moving until the control valve is actuated to close the passage thereby providing a predetermined time delay.

9 Claims, 3 Drawing Sheets

GAS CYLINDER CONTROL SYSTEM

This invention relates to control systems for providing a predetermined time delay of the machine system.

BACKGROUND OF THE INVENTION

In a typical fine blanking apparatus, it is desired to accurately cut and punch a part. Such apparatus usually comprises an upper die and a lower die with one or more punches associated with the upper die and a punch base associated with the lower die, and movable with respect to the lower die. In the forming of parts in order to insure the desired precision, it has been common to provide a delay in the movement of the punch base upwardly after the part has been cut and punched from the workpiece. Such a time delay has been produced by cam control of the punch bases or by a hydraulic system associated with the punch bases. A typical example of a hydraulic system is shown in U.S. Pat. No. 3,570,343.

Such hydraulic systems have a disadvantage in that they require associated hydraulic fluid lines, valves and the like externally of the hydraulic cushion on the press.

In U.S. Pat. No. 4,774,865, a hydraulic control system is provided wherein a cylinder assembly includes a first piston associated with and expose to the inert gas such as nitrogen in a manifold and a second piston engaged by the first piston and urged outwardly into engagement with a punch base. A hydraulic circuit is associated with the second piston and controlled by a valve such that upon downward movement of the first piston hydraulic fluid may flow freely without inhibiting the movement of the first piston, but upon actuation of the valve hydraulic fluid locks the first piston and thereby prevents it from moving upwardly until the valve is actuated so that a predetermined time delay is provided.

In U.S. Pat. No. 4,934,230, there is shown a hydraulic control system wherein a hydraulic time delay circuit associated with said cylinder assemblies such that upon downward movement of the pistons, hydraulic fluid may flow freely without inhibiting the movement of the pistons, and upon actuation, hydraulic fluid locks the pistons against movement and thereby prevents them from moving upwardly until the circuit is actuated so that a predetermined time delay is provided.

Among the objectives of the present invention are to provide a novel control system that utilized a gaseous control cylinder; which is easily maintained; which is low in cost; and which can be applied to die stamping systems or other machine systems.

SUMMARY OF THE INVENTION

In accordance with the invention, a gas cylinder control system for use with machine systems such as die stamping systems that includes at least one gaseous fluid cylinder associated with the machine system, gaseous intensifier control cylinder normally operated in timed relation to the gaseous cylinder and a passage providing communication between the gaseous cylinder and the gaseous intensifier control cylinder. The gaseous intensifier cylinder operates at substantially higher pressure than the die cylinder. A normally closed control valve is provided in the passage and is operable to open the passage in time relation to the operation of the machine system in order to apply the higher gaseous pressure of the gaseous intensifier cylinder to the gaseous cylinder and lock the gaseous cylinder and prevent it from moving until the control valve is actuated to close the passage thereby providing a predetermined time delay. The passage extends from the shaft end of the gaseous cylinder to the piston end of the control system.

DESCRIPTION

Figure 1:
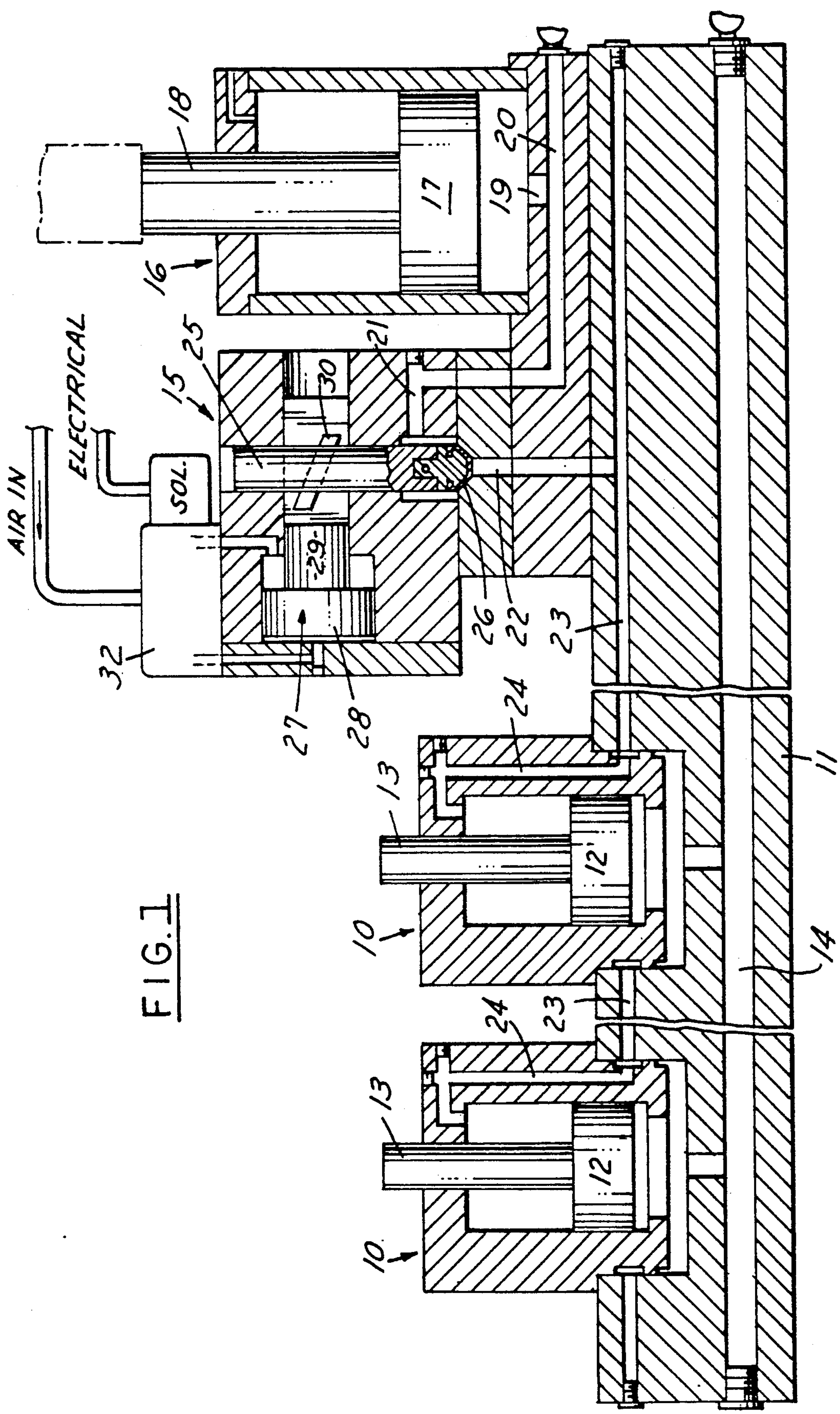
FIG. 1 is a partly schematic sectional view of a control system.
Figure 2:
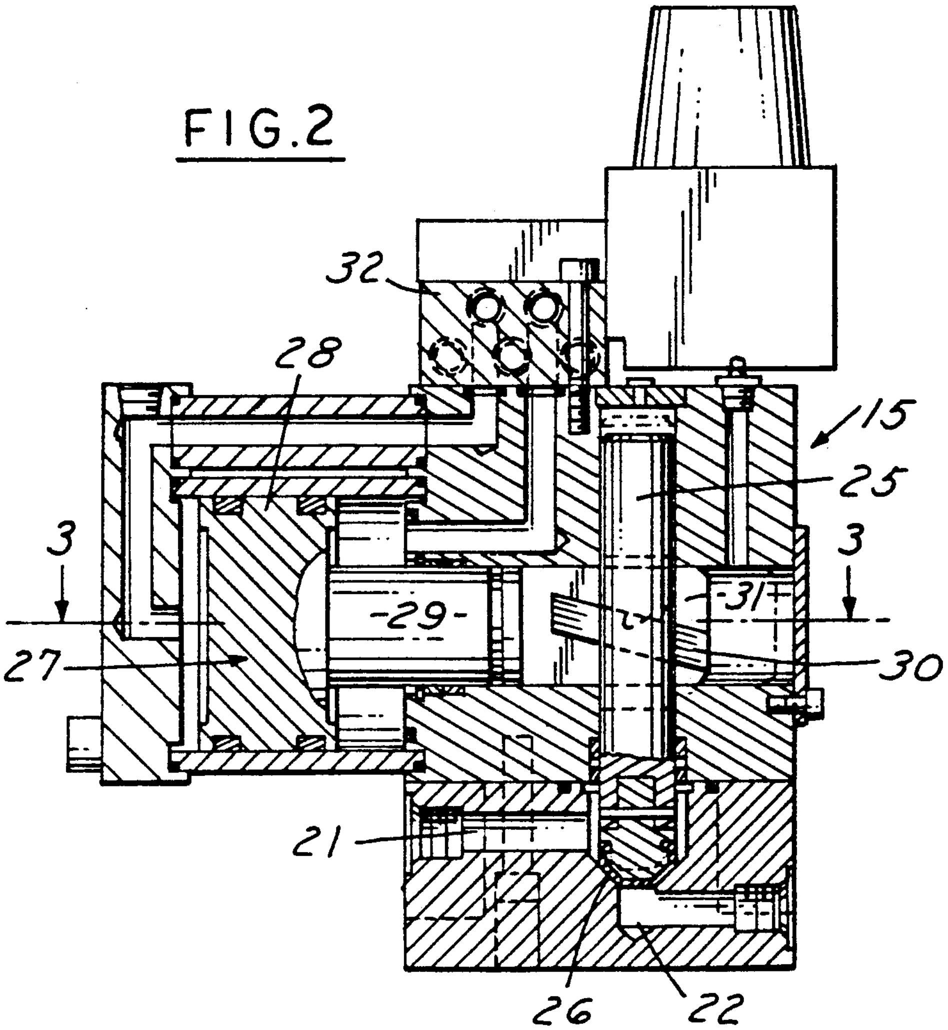
FIG. 2 is a sectional view of a control valve utilized in the system shown in FIG. 1.
Figure 3:
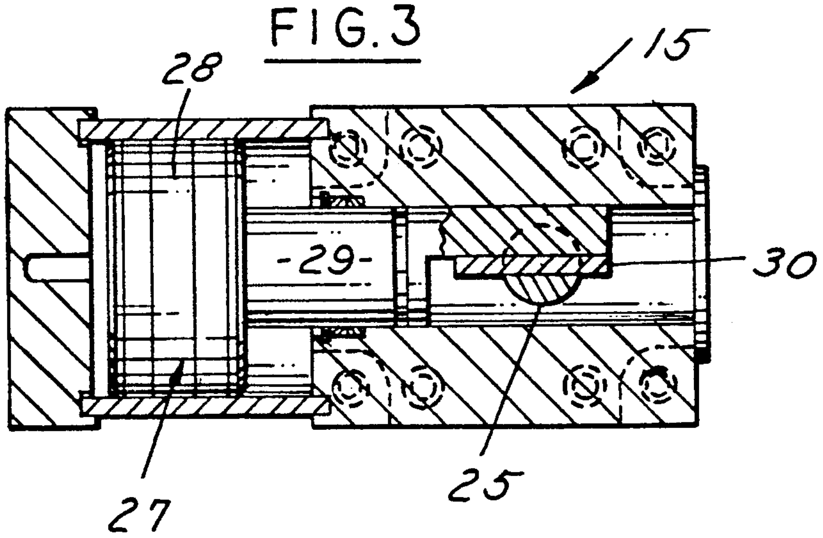
FIG. 3 is a sectional view taken along the lines 3—3 in FIG. 2.

Referring to FIG. 1, a control system embodying the invention comprises one or more gaseous cylinders 10 that are mounted on a manifold 11. Each cylinder 10 includes a piston 12 with a shaft 13 extending to the exterior and adapted to be engaged by a portion of a machine system such as a die stamping machine. The gaseous fluid in the chamber 14 of the manifold 11, such as nitrogen, yieldingly urges the piston 12 upwardly as viewed in FIG. 1. Such cylinders 10 may be of the type shown, for example, in U.S. Pat. Nos. 4,342,448, 4,572,489 and 4,583,722.

Figure 4:
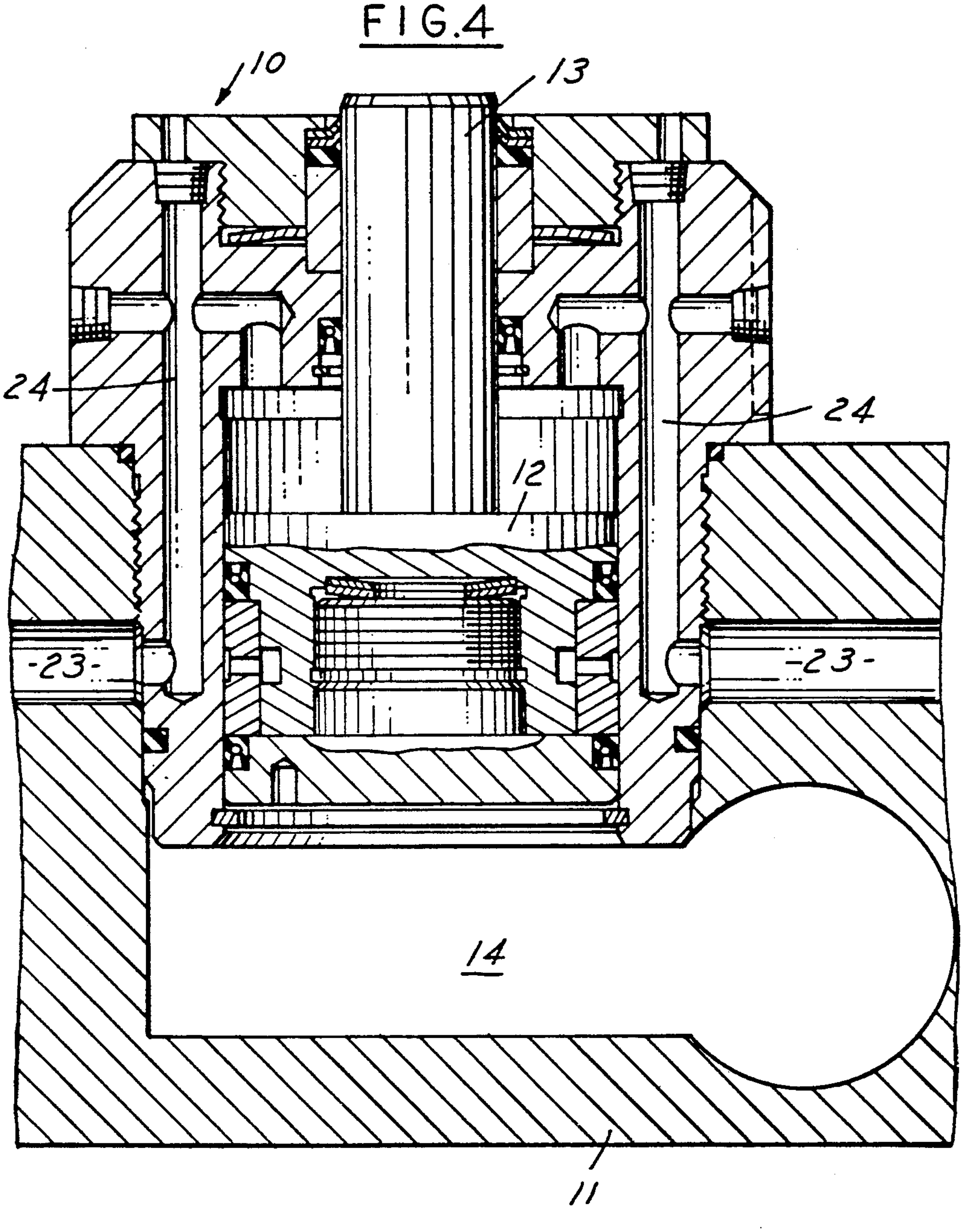
FIG. 4 is a sectional view on an enlarged scale of one of the die cylinders shown in FIG. 1.

In the preferred form of the invention shown in FIGS. 1-4, a plurality of die cylinders 10 are provided, each of which has a piston 12 and a rod 13 that functions, for example, in contact with a portion of a die of a press. The gaseous die cylinders 10 are associated with the manifold 11 which has a chamber 14 communicating with the open end of the cylinder 10 to apply gaseous pressure to the piston 12 of each cylinder urging the piston outwardly. A gaseous intensifier control valve 15 is provided in association with a gaseous intensifier control cylinder 16 that has a piston 17 and a rod end 18 also operated by the die or press in timed relationship with the rods and pistons of the die cylinders. The lower portion of the cylinder 16 beneath the piston 17 communicates through an opening 19 with a passage 20 that extends to a passage 21 in valve 15. An outlet passage 22 extends from the valve 15 to a passage 23 that communicates with the passage 24 to the rod end 13 of each piston 12. A reciprocable valve member 25 is movable in and out of sealing engagement with a valve seat 26 for opening and closing the valve 15. Passage 22 to the gaseous control cylinder 16 communicates on one side of seat 26 and passage to the die cylinders communicate to the other side of seat 26. The valve member 25 is moved by operation of an air operated cylinder 27 that includes a piston 28 having a rod 29 that carries a cam 30 engaging a cam groove 31 for moving the valve member toward and away from the seat. Air from a source is controlled by solenoid operated cylinder valve 32 for applying pressure to passage 22, 23 selectively or shifting the valve member 25 to and from open and closed positions. Each gas cylinder 10 is of conventional structure as shown in FIG. 4.

In a typical example of operation, the following conditions will occur:

1. Press down—(gas in intensifier compressed to approximately 2520 psi).
2. Electrical signal from rotary switch on press crank causes air valve and air cylinder to shift, opening nitrogen valve 15 (pressure drops to approximately 2200 psi.) including on rod end of cylinder piston.

3. Delayed electrical signal causes valve 15 to close.
4. Press returns-up.
5. Electrical signal from rotary switch causes valve 15 to open (pressure drops to approximately 420 psi.).
6. Delayed electrical signal causes valve 15 to close.

Thus, the primary lines, for example, have a pressure of approximately 1500 psi. when the press is up to approximately 1800 psi. when the press is down.

The secondary lines have a pressure of approximately 420 psi. when the press is up; approximately 2520 psi. when the press is down and the valve 15 is closed; and approximately 2200 psi when the press is down and the valve 15 is opened.

The system is particularly useful in fine blanking and embodying the invention is intended to be used with a die stamping apparatus in a press wherein an upper die assembly is provided on the upper portion of the press and a lower die assembly is provided on the lower portion of the press. The upper die includes an upper punch that is movable by a die cushion downwardly to punch a slug from a workpiece. The lower die includes a lower pad associated with the punch and movable downwardly within the die. A punch base is supported by a plurality of cylinder assemblies as presently described. The cylinder assemblies are mounted on a manifold which is supplied with inert gas such as nitrogen under a predetermined high pressure. The pressure of the inert gas may vary between about 500 and 2000 psi.

It can thus be seen that there has been provided a novel control system that utilized a gaseous control cylinder; which is easily maintained; which is low in cost; and which can be applied to die stamping systems or other machine systems.

I claim:

1. A gas cylinder control system for use with machine systems in timed relation such as die stamping systems that include

- a gaseous fluid cylinder operated by a gas and adapted to operate periodically by a machine system,
- a gaseous intensifier control cylinder normally operated in timed relation with said gaseous cylinder,
- said gaseous intensifier control cylinder and said gaseous fluid cylinder each having a piston;
- means defining a passage providing communication between the gaseous fluid cylinder and the gas intensifier control cylinder,
- said gaseous intensifier control cylinder being of a size such that it operates at substantially higher pressure than said gaseous fluid cylinder when said cylinders are moved to increase the pressure thereon,
- a gaseous intensifier control valve provided in said passage and operable to open the passage in timed relation to the operation of a machine system in order to lock the gas in the gaseous fluid cylinder and prevent the gas cylinder from moving until the control valve is actuated thereby providing a predetermined time delay.

2. The control system set forth in claim 1 wherein said gaseous intensifier control cylinder and said gaseous fluid cylinder each having a piston including a rod end and a piston end,

- said passage extending from the piston end of said gaseous intensifier control cylinder to the rod end of said gaseous fluid cylinder such that when the control valve is opened the pressure of gas on the piston end of the gaseous intensifier control cylinder is applied to the rod end of the die cylinder to lock the gas in the gaseous fluid cylinder into position.

3. The gas cylinder control system set forth in claim 2 wherein said gaseous intensifier control valve comprises a body having a valve seat, a valve member reciprocable in said body toward and away from said valve seat, said passage from said gaseous intensifier control cylinder communicating with one side of said valve seat, said passage from said gaseous fluid cylinder communicating with the other side of said valve seat.

4. The gas cylinder control system set forth in claim 3 including means for moving said valve member toward and away from said valve seat.

5. The gas cylinder control system set forth in claim 4 wherein said means for moving said valve member comprises a camming member movable toward and away from said valve member, a cam on one of said camming member and valve member and a cam track on the other of said camming member and valve member.

6. A gas cylinder control system for use with machine systems operable in timed relation such as die stamping systems that include

- a gaseous fluid cylinder operated by a gas and adapted to be operated periodically by a machine system,
- a gaseous intensifier control cylinder normally operated in a timed relation with said gaseous fluid cylinder,
- means defining a passage providing communication between the gaseous fluid cylinder and the gas intensifier control cylinder,
- said gaseous intensifier control cylinder being of a size such that it operates at substantially higher pressure than said gaseous fluid cylinder when said cylinders are moved to increase the pressure thereon,
- a gaseous intensifier control valve provided in said passage and operable to open the passage in timed relation to the operation of a machine system in order to lock the gaseous fluid cylinder and prevent it from moving until the control valve is actuated thereby providing a predetermined time delay,
- said gaseous intensifier control cylinder and said gaseous fluid cylinder each having a piston including a rod end and a piston end,
- said passage extending from the piston end of said gaseous intensifier control cylinder to the rod end of said gaseous fluid cylinder such that when the control valve is opened the pressure on the piston end of the gaseous intensifier control cylinder is applied to the rod of the die cylinder to lock the gaseous fluid cylinder into position,
- said gaseous intensifier control valve comprising a body having valve seat, a valve member reciprocable in said body toward and away from said valve seat, said passage from said gaseous intensifier control cylinder communicating with one side of said valve seat, said passage from said gaseous fluid cylinder communicating with the other side of said valve seat,
- means for moving said valve member toward and away from said valve seat,
- said means for moving said valve member comprising a camming member movable toward and away from said valve member, a cam on one of said camming member and said valve member and a cam track on the other of said camming member and said valve member.

7. The gas cylinder control system set forth in claim 1 including a gaseous operating cylinder including a piston operatively connected to the movable member.

8. The gas cylinder control system set forth in claim 7 including an operating valve for controlling the flow of fluid to said gaseous operating cylinder.

9. The gas control system set forth in claim 8 wherein said operating valve is solenoid operated.

* * * * *